W. LENEHAN.
LAWN EDGE TRIMMER.
APPLICATION FILED JULY 9, 1921.
1,428,696.
Patented Sept. 12, 1922.
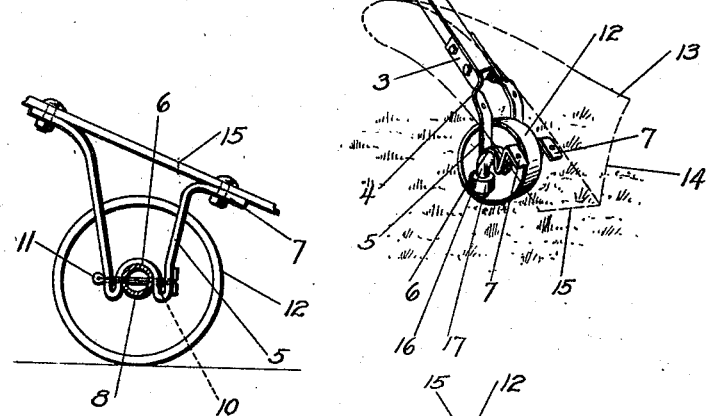
Fig. 1.
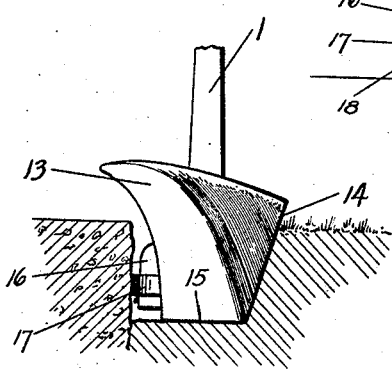
Fig. 2.
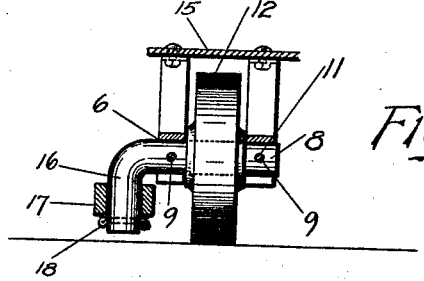
Fig. 3.
Fig. 4.
INVENTOR.
BY William Lenehan
ATTORNEY.

Patented Sept. 12, 1922.

1,428,696

UNITED STATES PATENT OFFICE.

WILLIAM LENEHAN, OF DENVER, COLORADO.

LAWN-EDGE TRIMMER.

Application filed July 9, 1921. Serial No. 483,412.

*To all whom it may concern:*

Be it known that I, WILLIAM LENEHAN, a citizen of the United States, residing at Denver, in the county of Denver and State of Colorado, have invented new and useful Improvements in Lawn-Edge Trimmers, of which the following is a specification.

The present invention is directed to improvements in edge trimmers for lawns or the like, and has for its object to provide a device of this character constructed in such manner that the operator can with comparative ease push the same forwardly to effectively trim the lawn.

A further object of the invention is to provide a device of this kind constructed in such a manner that the ground wheel and cutting edges will be so alined as to eliminate side draft as the device is being operated.

With these and other objects in view, this invention resides in the novel features of construction, formation, combination and arrangement of parts to be hereinafter more fully described, claimed and illustrated in the accompanying drawing, in which:—

Figure 1 is a perspective view of the device.

Figure 2 is a fragmentary side elevation.

Figure 3 is a transverse sectional view.

Figure 4 is a front view.

Referring to the drawing, 1 designates a handle, preferably formed from wood, and having a push bar 2 on its outer end, said handle having bolted thereto a pair of bars 3, which constitute a frame. The bars 3 of the frame are formed from strap metal, and are partially twisted, as at 4, and terminate in open loops 5, said loops having their bight portions bent upwardly to provide downwardly opening bearings 6. The forward ends of the loops terminate in plates 7, the purpose of which will appear later. It will be noted that the bars are vertically disposed against the sides of the handle 1, and that by twisting the same, as at 4, the material forming the loops 5 and bearings 6 will be disposed horizontally, thereby providing even bearings for the ends of the tubular axle 8.

The ends of the axle 8 are formed with perforations 9 which register with perforations 10 formed in the bearing 6, cotter-pins 11 being removably engaged in these registered perforations, and serve to hold the axle firmly in the bearings. Rotatably engaged on the axle 8 is a ground wheel 12, said wheel being located between the loops 5.

A moldboard, shown in dotted lines in Fig. 1, and designated by the numeral 13 is provided, and has a vertical cutting edge 14, and a substantially horizontally disposed cutting edge 15, the angular relation between these cutting edges being such as to cut the desired shape and size gutter. The moldboard is bolted to the plates 7 and arms 3, thus bridging the open ends of the loops 5, and balancing the device.

It is obvious that as the device is pushed along the cutting depth can be regulated conveniently upon simply raising or lowering the handle 1, and since the cutting edges are so alined with respect to the wheel 12 the device can be pushed with comparative ease. The moldboard is so shaped that the cut sod will be deflected laterally during the cutting operation.

One end of the axle 8 terminates in a downwardly directed arm 16 on which is rotatably engaged a sleeve 17, said sleeve being retained on the arm by a cotter-pin 18, or the like. This sleeve lies adjacent the ground wheel 12, and is adapted to engage the edge of the curbing or pavement as the device is in motion, thus serving as a gage.

From the foregoing, it is thought that the many advantages, construction, and operation of the herein described invention will be apparent to those skilled in the art without further description, and it will be understood that various changes in size, shape, proportion and minor details of construction may be resorted to without departing from the spirit or sacrificing any of the advantages of the invention.

What is claimed is:

1. In a lawn edge trimmer, the combination with a frame having loops formed in the sides thereof, bearings formed in the loops, of a wheeled axle having its ends removably engaged in the bearings, a moldboard fixed to the frame upon opposite sides of the loops, said moldboard having angularly disposed cutting edges, and a handle for the frame.

2. In a lawn edge trimmer, the combination with a frame having loops formed in its sides, bearings in the loops, of an axle engaged in the bearings, bolts passable through the loops, bearings and axle, a wheel rotatably engaged on the axle, a moldboard having angularly disposed cutting edges and detachably secured upon opposite sides of the loops, and a handle secured to the frame.

3. In a lawn edge trimmer, the combination with a frame having bearings in the sides thereof, and axle engaged in the bearings, a ground wheel rotatably engaged on the axle, one end of said axle terminating in a downwardly turned arm, a sleeve rotatably engaged on said arm, and a moldboard secured to the frame and having angularly disposed cutting edges.

In testimony whereof I have hereunto set my hand in presence of two subscribing witnesses.

WILLIAM LENEHAN.

Witnesses:
SULLIVAN V. JOHNSON,
WM. W. SAMPSON.